Oct. 19, 1943.  J. G. DEEGAN  2,332,306
HATCH COVER AND HATCH COVER BEAMS
Filed Jan. 28, 1941  5 Sheets-Sheet 2
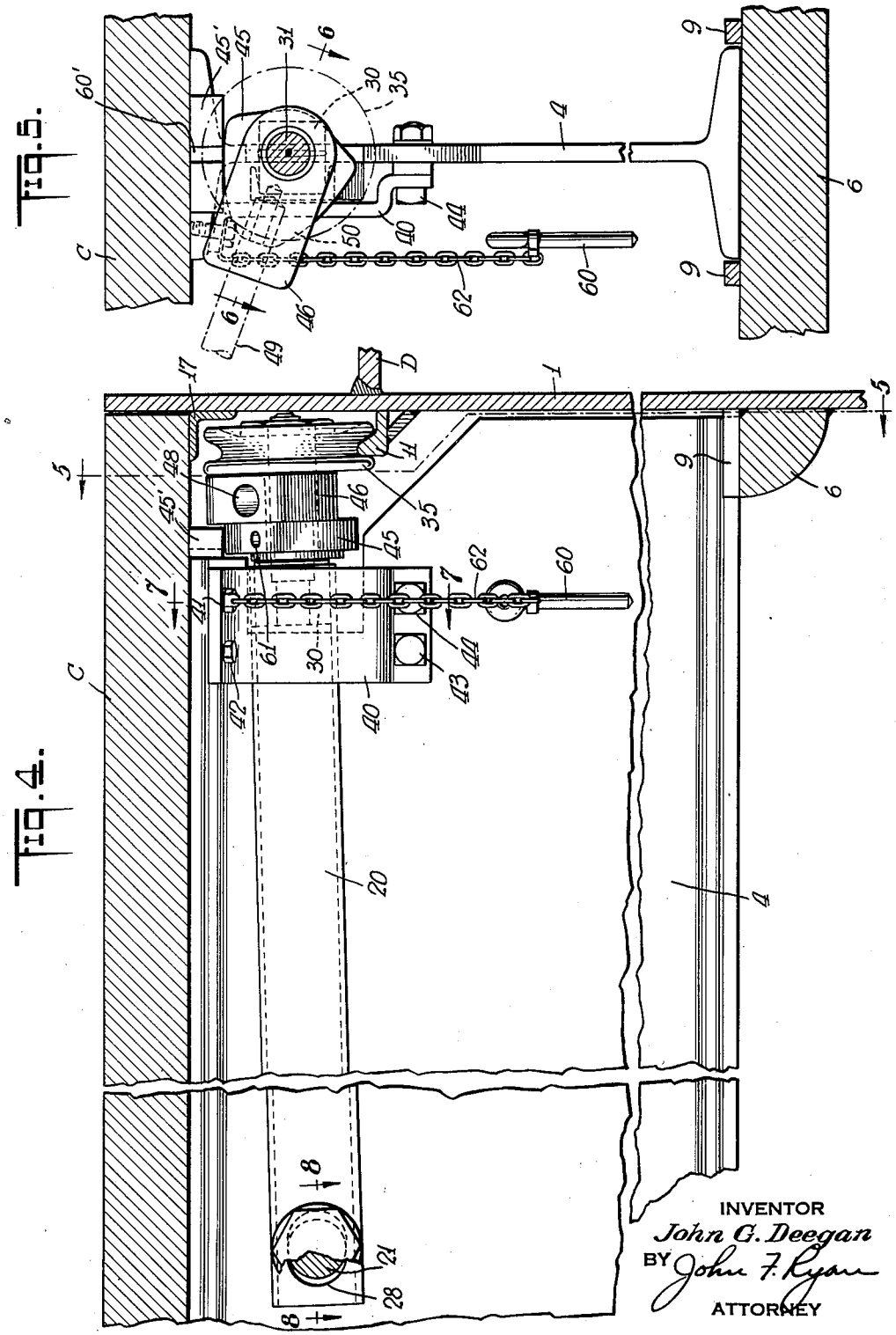
INVENTOR
John G. Deegan
BY John F. Ryan
ATTORNEY Oct. 19, 1943.          J. G. DEEGAN                2,332,306
                HATCH COVER AND HATCH COVER BEAMS
                   Filed Jan. 28, 1941          5 Sheets-Sheet 3
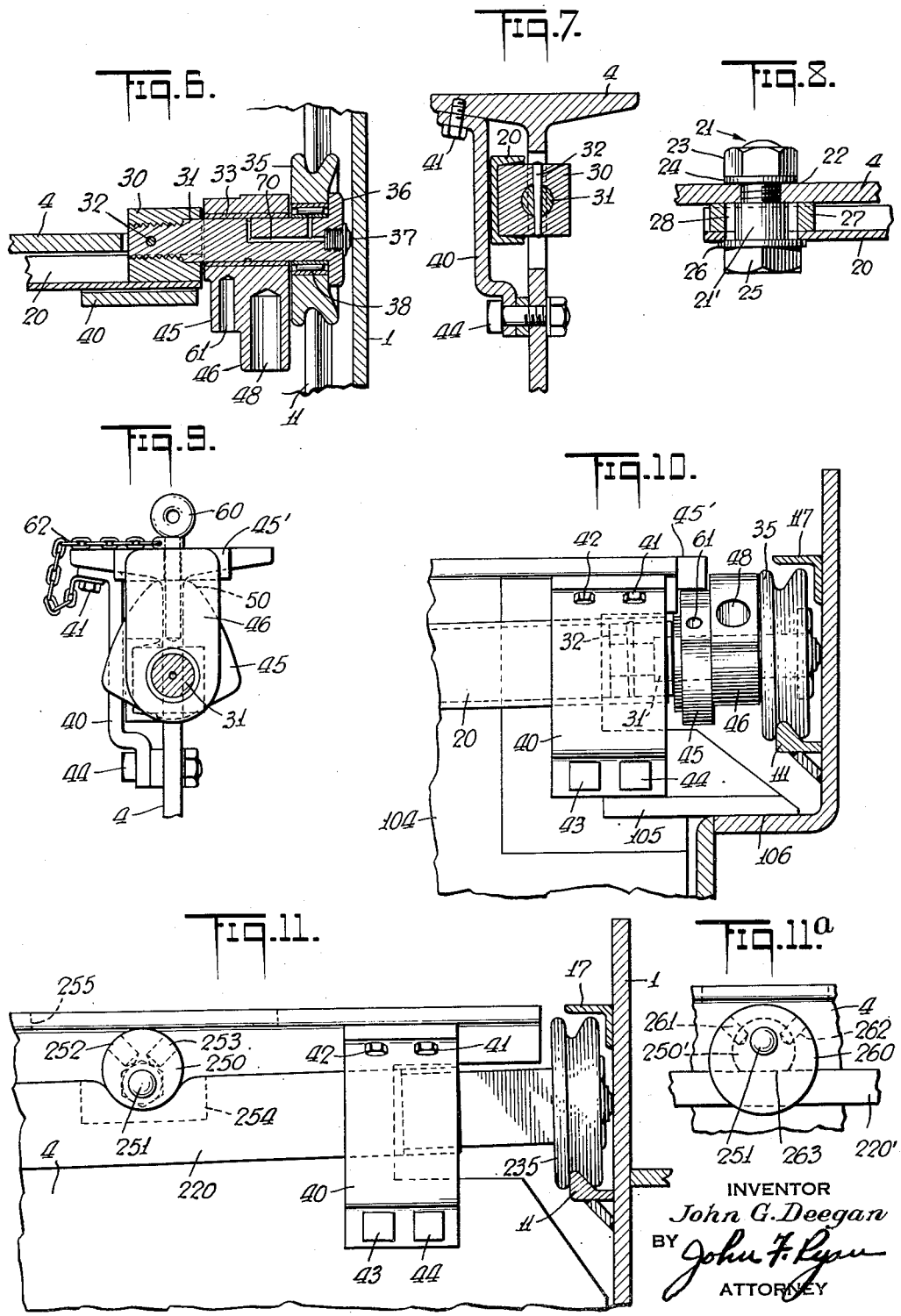
INVENTOR
John G. Deegan
BY John F. Ryan
ATTORNEY Oct. 19, 1943.  J. G. DEEGAN  2,332,306
HATCH COVER AND HATCH COVER BEAMS
Filed Jan. 28, 1941  5 Sheets-Sheet 4
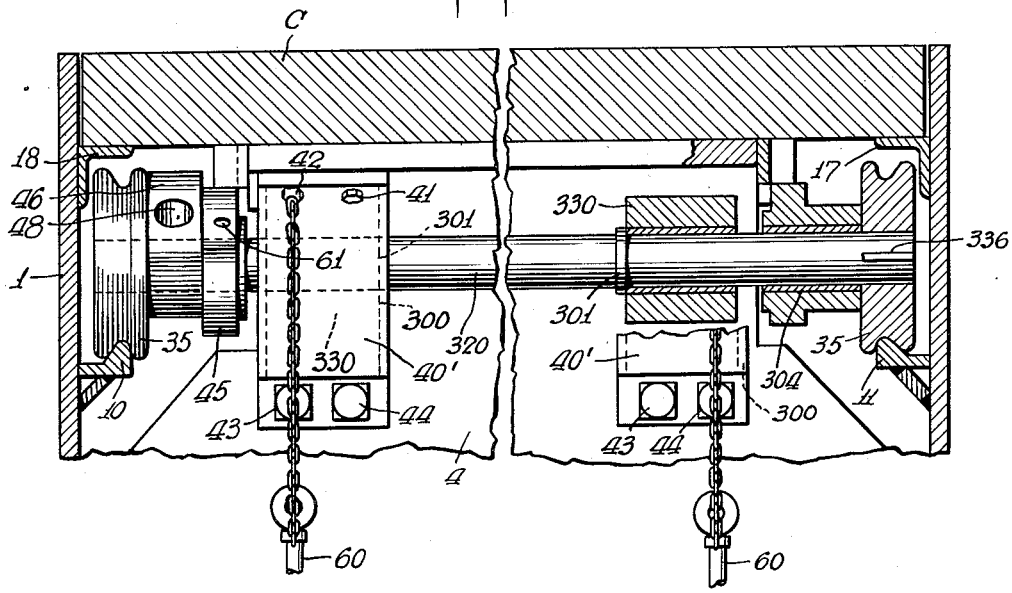
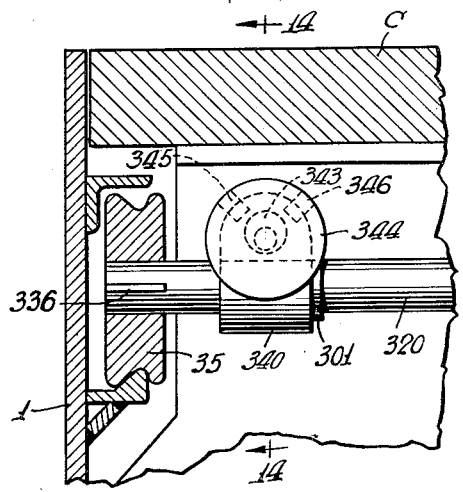
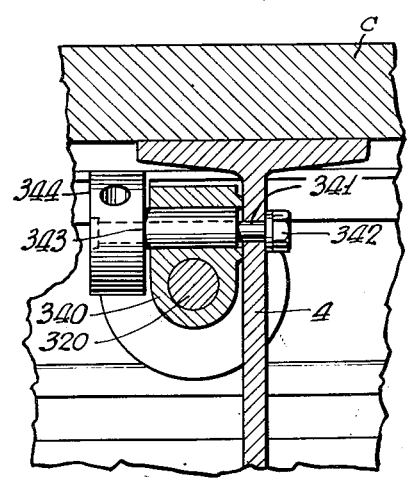
INVENTOR
John G. Deegan
BY John F. Ryan
ATTORNEY Oct. 19, 1943.        J. G. DEEGAN        2,332,306
HATCH COVER AND HATCH COVER BEAMS
Filed Jan. 28, 1941        5 Sheets-Sheet 5

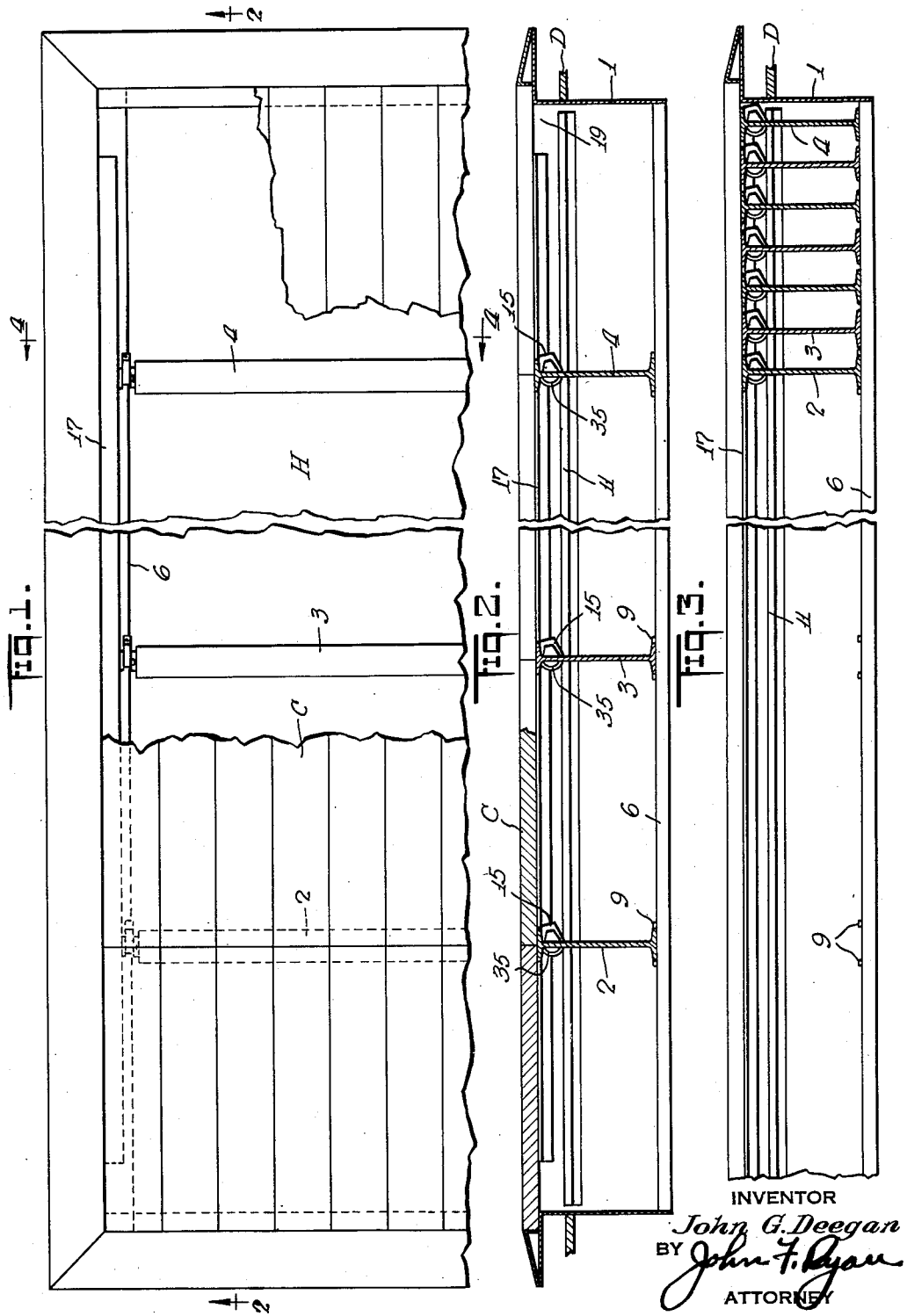

INVENTOR
John G. Deegan
BY John F. Ryan
ATTORNEY

Patented Oct. 19, 1943

2,332,306

UNITED STATES PATENT OFFICE 2,332,306

HATCH COVER AND HATCH COVER BEAM

John G. Deegan, Forest Hills, N. Y., assignor, by mesne assignments, to Waterman Steamship Corporation, a corporation of Alabama Application January 28, 1941, Serial No. 376,294

2 Claims. (Cl. 114—201)

This invention relates to means for moving hatch beams or hatch covers from their normal closed position to a position at one or both ends of the hatchway so as to permit the loading or unloading of freight.

As is well known in the shipbuilding art, access to the lower decks of a freight carrying vessel is had through relatively large superimposed rectangular openings, called hatchways, through each of the successive decks from the topmost one to the lowermost one. The top or weather deck hatchway is surrounded by a relatively strong framing or coaming made of steel, and designed to rise above the surface of the deck approximately two or three feet. This coaming serves to strengthen the deck and framework of the vessel so as to compensate for the removal of that much of the deck which forms the hatchway space. It also serves, because of its projection above the deck, to prevent water from going down the hatchway opening if waves should break over the deck. A hatch cover resting on beams, closes the hatchway.

Hatch covers must be made relatively strong and heavy because they may be subjected to the pounding of heavy seas and experience indicates that the failure of hatch covers may result not only in damage to the goods stored below decks, but in some instances, in the loss of the vessel because of flooding of the hold. For these reasons, it is imperative that hatch covers be not only waterproof, but relatively strong, so they are supported on heavy I beams spanning the hatch opening.

It is an object of this invention to produce a mechanism which will permit the ready handling and moving of heavy supporting beams or the hatch covers themselves. Inasmuch as the supporting beams may weigh from one to two tons, it is a considerable task to remove them and find storage space for them during the loading and unloading of the cargo. Modern steel hatch covers are also heavy and this invention can be advantageously used to remove and install them in place.

Another object of this invention is to produce a mechanism which permits not only the ready movement of the beams or hatch covers, but also permits these to be moved and stored at one or both ends of the hatchway, thus leaving the center of the hatchway free for the loading or unloading of the freight. Means is also provided in this invention for the complete removal of the supporting beams from the hatch if this becomes necessary. Inasmuch as the beams when moved to the ends of the hatch opening occupy only about ⅛ of the total area of the hatchway, their complete removal is seldom required.

Another object of the present invention is to provide a device of this character which will enable the beams or hatch covers to be readily and easily rolled along tracks provided for this purpose. This is accomplished by furnishing these parts with relatively large rolling wheels equipped with ball or roller bearings and means for keeping them well lubricated.

Still a further object of this invention is to provide a guard for the trackway upon which the hatch beams may roll, and at the same time, a guard to prevent accidental lifting of the hatch beams should an ascending cargo swing come up under the beam. However, in case of accidental damage to the rolling mechanism, it can be readily removed for repair or replacement.

Another object of the invention is to produce a device which does not add appreciably to the weight of the beam, and a device which can be operated without any special tools or wrenches. Heretofore, many portable rolling mechanisms used parts or handles or wrenches which were detachable, and when lost or misplaced made the mechanism unusable. The present device has no such detachable parts and can be operated with any ordinary round bar of suitable diameter. Such bars may be made from pipe or solid stock and can be readily found around the ordinary freight boat.

A still further object of this invention is to produce a device of this character wherein the rolling gear does not carry the weight of the beam except when the beam is being moved from one position to another.

Other objects and advantages will be apparent from the following description when taken in connection with the accompanying drawings.

In the drawings Fig. 1 is a diagrammatic plan view showing the disposition of a number of hatch beams when in position to receive a hatch cover for closing the hatchway;

Fig. 2 is a section through 2—2 of Fig. 1;

Fig. 3 is also a section through 2—2 of Fig. 1 but showing the beams all moved over to one end of the hatchway;

Fig. 4 is a section in side elevation taken through 4—4 of Fig. 1 showing the lifting and rolling mechanism applied to one end of a hatch beam;

Fig. 5 is a section through 5—5 of Fig. 4;

Fig. 6 is a section through 6—6 of Fig. 5;

Fig. 7 is a section through 7—7 of Fig. 4;

Fig. 8 is a section through 8—8 of Fig. 4;

Fig. 9 is a section through 5—5 of Fig. 4 but showing the cam mechanism in such position as to raise the beam so that the weight thereof rests upon the rollers;

Fig. 10 is a side elevation of the rolling mechanism as it may be installed in an off-set coaming;

Fig. 11 is a side elevation showing another embodiment of the invention;

Fig. 11a is a fragmentary side elevation of a modified form of the lifting device shown in Fig. 11;

Fig. 12 is a side elevation partly in section of another embodiment of my invention;

Fig. 13 is a side elevation partly in section of still another embodiment of my invention;

Fig. 14 is a section through 14—14 of Fig. 13;

Figure 15:
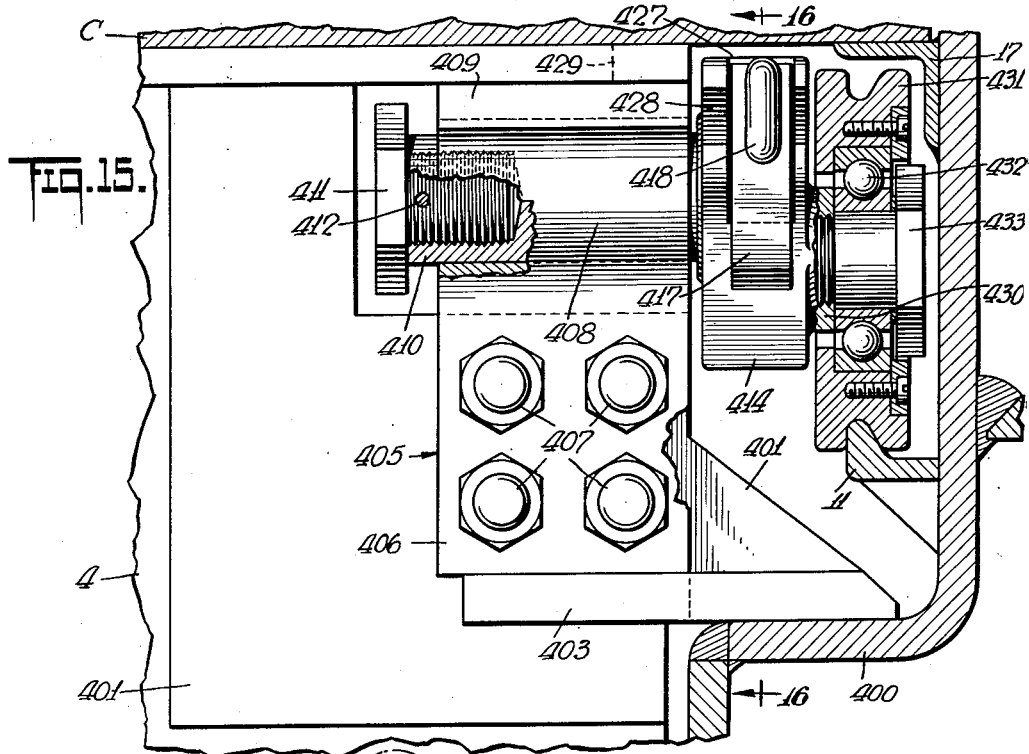
Fig. 15 is a side elevation partly in section of another embodiment of the invention.

Figs. 1, 2 and 3 illustrate a diagrammatic representation of a hatchway with hatch beams installed therein. For purposes of illustration, the beams have been made relatively large in relation to the size of the hatchway opening. In actual practice, with a 40 foot hatchway, the beams will occupy only about 5 feet at either end when they are all moved close together as shown in Fig. 3.

Looking at Figs. 1, 2 and 3, 1 discloses a hatchway coaming or framing for hatch opening H in deck D. Three hatch beams are shown at 2, 3 and 4. The hatch cover is shown at C. Usually the beams are arranged to run from the port to the starboard side of the hatch opening and are moved fore and aft to provide for the loading and unloading of the cargo. The port and starboard sides of the coaming are furnished with beam supporting members 6 (only one shown). These may be made of quarter round stock, angle or channel irons securely welded to the inside of the coaming or hatch frame and extending along both sides of the frame from the forward to the aft ends thereof. Upon these members 6, the hatch beams normally rest to receive any load which may be imposed upon them. These members 6, are furnished with short square bars or cleats shown at 9. These cleats are attached to the members 6 in such position as to locate the I beams where they are normally positioned to support the hatch covers when the hatch is closed. They prevent the beams from sliding longitudinally on the members 6. They also serve to locate the beams in the same place each time the hatch is about to be closed. This is important because the hatch beams and hatch covers should be in the same relative position in order that the hatch covers will be properly supported.

Above the members 6 are a pair of tracks 10 and 11. These tracks may be made from part of a bulb angle or a structural steel shape of any other suitable cross section. They are designed to receive and support wheels upon which the hatch beams rest when it is desired to move them. In Fig. 2, these wheels are shown at 35. One wheel is disposed at each end of each beam and is made in the form of a grooved pulley to cooperate with the shape of the tracks 10 and 11 as is more clearly described hereinafter.

A lifting mechanism shown in diagrammatic form at 15, is attached to each end of each beam. It is so designed as to permit the lifting of the I beam so that the weight thereof rests upon the wheels 35. The beams may be lifted far enough to clear the cleats 9 so they may roll along tracks 10 and 11 from the forward to the aft end of the hatchway, and back again. For stowing the beams they are lifted off the members 6 and rolled from the positions shown in Figs. 1 and 2 to the position shown in Fig. 3. If desired, some of the beams can be stowed at one end and some at the other.

Angle supports shown at 17 and 18 are attached to the inside of the hatch framing above the tracks 10 and 11. These serve to support the edges of the hatch cover H and also to prevent accidental lifting of a beam and its lifting mechanism, as will be more fully described. These angle members are cut off short at each end to permit a space between the ends thereof and the wall of the hatch framework so that if it is desired, the beams may be entirely lifted out of the hatchway. Such a space is shown at 19 (Fig. 2).

Figs. 4 to 9 are views showing the details of construction of one form of the lifting mechanism attached to each end of each beam. If it is desired to equip the hatch covers themselves with such mechanism, one should be installed at each corner of each hatch cover or unit part of each hatch cover.

Looking at the above mentioned figures, 20 discloses a pivoted arm which may be made of standard channel cross section. It is pivoted to the web of beam 4 by means of bolt 21 which is shown in Figs. 4 and 8. Bolt 21 consists of a body portion 21' of relatively large cross-sectional area and a reduced threaded portion 22 which is designed to pass through a drilled hole in the web of beam 4. A suitable nut 23 and washer 24 serves to attach bolt 21 to the web of beam 4. This bolt is furnished with a head 25 underneath which is disposed a washer 26, and between this washer 26 and the web of beam 4, the arm 20 is held in place. In order to increase the bearing surface of arm 20 on the bolt 21, a drilled block 27 is welded to the arm (Fig. 8). Through the block 27, and the web of the channel arm 20, a slot 28 is cut to accommodate the enlarged portion 21' of the bolt 21. This slot is elongated in shape so that the arm 20 may slide through a very limited distance longitudinal of the beam 4.

The opposite end of arm 20 or the right end as viewed in Fig. 4, is also equipped with a square block securely welded thereto as shown at 30 (Fig. 7). Block 30 is drilled and threaded along a line parallel to the longitudinal axis of arm 20 to receive an axle 31. This axle is held in place in block 30 by means of screw threads and a tapered pin 32. Axle 31 is equipped with a sleeve of suitable bearing material 33. Mounted on axle 31 at the outer or right end thereof as viewed in Figs. 4 and 6, is a grooved pulley or wheel 35, designed to travel upon track 11. An enlarged end portion or head 36 on axle 31 serves to retain and hold the wheel 35 in place thereon. Pulley wheel 35 is shown equipped with roller bearing 38. It is desirable to make the pulley wheels relatively large in diameter and to equip them with roller or ball bearings, but this is not necessary, as can be well understood, and the mechanism is operable if only plain bearings are used.

In order to hold the pivoted arm 20 in proper relation to the beam 4, a more or less Z-shaped strap 40 is used. The uper end of strip 40 is attached to the flange of beam 4 by means of bolts 41 and 42 and the lower end to the web of the beam by means of bolts 43 and 44.

On axle 31 between block 30 and wheel 35 is positioned a rotatable cam element which serves to lift and lower the beam 4 in relation to the arm 20 and axle 31. This element comprises a cam surface 45 and a handle retaining portion 46. These two parts are made integral and are designed to rotate about the axle 31. The portion 46 has a handle receiving recess 48 which may be conveniently circular in cross-section and produced by drilling the member 46. This recess is designed to receive a handle 49 which is removable and because of its circular cross section, pipe or pins of various kinds can be utilized in the event the regular handle is lost or misplaced. Attached to the underside of the upper portion of the beam 4, is a cam block 45' with which the operating surface of the cam is designed to cooperate. As will be seen in Figs. 5 and 9, the high point of the cam member 45, which point is shown at 50, extends from the axle 31 in the same direction as the handle receiving recess. Locking pin 60 is designed to pass through a slot 60' in the upper flange of the beam 4 and into locking recess 61 of cam portion 45, for locking the cam mechanism in the position shown in Fig. 9. This pin can be conveniently attached by chain 62 and bolt 41. Suitable oil or grease passageways 70 are drilled in the axle 31 to provide lubrication for the wheel 35 and the rotatable cam mechanism. Access to the oil or grease passages may be had by removal of plug 37. The usual oil or grease fitting can be connected to these passageways for high-pressure lubrication if desired.

The hatch framing or coaming shown in Fig. 10, is of the off-set type wherein the dimensions of the coaming are greater than the dimensions of the lower part of the hatch framing so that hatch beams may rest upon the resulting off-set and the track or rail 111 and the angle 118 are protected from slings or goods passing up or down through the hatchway. The beam 104 is furnished with right angularly disposed supporting plates 105, one of which is welded or otherwise attached on each side of the web of the beam. These rest upon the off-set surface of the coaming or framing 101 as shown at 106. Mechanism for raising the beam 104 is the same as that which has heretofore been described and the same numerals have been attached to the same parts.

After removal of the hatch cover C, the beams will be found in the position illustrated in Fig. 1. If it is desired to move all the beams to one end as shown in Fig. 3, the lifting mechanism on beam 4 can first be operated. This is done by placing the handle 49 in handle recess 48 and rotating the cam mechanism in a clockwise direction as viewed in Fig. 5, that is, from the position shown in Fig. 5 to the position shown in Fig. 9. This operation will cause the cam surface to lift the beam 4 by the action of the cam surface on cam block 45'. The lifting mechanism at each end of the beam 4 is thus operated and the result is that the beam is raised sufficiently so that it clears the cleats 9 and may be rolled toward either end of the hatchway. The beams may be rolled by hand, but preferably this is done by power through the use of a suitable block and tackle arrangement. Beams 3 and 2 are likewise raised and moved. After each beam is raised, it can be locked in place by the insertion of the pin 60 as shown in Fig. 9.

Supporting members 17 and 18 are shorter than the length of the hatchway, and thus, suitable space such as that shown at 19 of Fig. 2, is provided so that the beams may be raised and taken out entirely from the hatchway. In order for the lower portion of the ends of the beams to clear the tracks 11 and 12, the beams can be turned at a slight angle to their original direction because they are not quite as long as the free space provided for them between the inside surfaces of the hatchway or coaming. When thus turned, they can be lifted out and clear the track 11.

In Fig. 11 is shown another embodiment of the invention which consists of a movable arm 220 pivoted to beam 4 at its end which is not shown in the figure in the same manner as arm 20. On the outer end of this arm 220, is wheel 235. The coaming or framing is indicated at 1, the track at 11 and the angle support for the edges of the hatch covers at 17. Mounted on the web of beam 4 is a hand operated eccentric 250. This is supported on a suitable bolt such as that shown at 251. The eccentric is equipped with two handle receiving apertures 252 and 253, for rotating it. A pressure block 254 is welded into the arm 220 and recessed to approximately coincide with the curvature of eccentric 250. A long slot 255 is cut in the upper flange of the beam 4 immediately above the eccentric 250. This slot enables the operating handle to be put into the apertures 252 and 253 and to be swung to right or left in operating the device.

Upon rotation of the eccentric cam 250, the beam is moved in relation to the arm 220. When in the position shown in Fig. 11, the beam is in its lowermost position. If the eccentric 250 is rotated to the right or left, the beam is moved upwardly in relation to the arm 220.

In Fig. 11a is shown a type of cam which may be used with the arm construction illustrated in Fig. 11 in place of cam 250 of that figure. Looking at Fig. 11a, 4 is a hatch beam, 220' is an arm like 220 except that it has no pressure block 254 or any depression therein as shown in Fig. 11. Cam 250' is rotatable on pin 251 which is mounted in the web of beam 4. Cam 250' is equipped with a flange 260 designed to hold arm 220' in parallel relationship to the web of beam 4. Cam 250' has two handle receiving sockets 261 and 262 for operating handles which may be used to rotate this cam. A flat surface 263 on cam 250' will serve to hold it fixed in relation to arm 220' when the beam is raised as is shown in Fig. 11a. This flat surface prevents the beam from slipping back onto the members 6 and 7 upon which it normally rests when in use. This construction, including a flange on the cam, makes the strap 40 unnecessary.

With the construction shown in Figs. 11 and 11a, it is advisable to place the arms 220 at opposite sides of the web of beam 4, that is, the arm at one end of the beam should be at one side of the web, and the arm at the other end of the beam at the other side of the web. This permits the beam to hang on wheels 235 without twisting.

In Fig. 12 is shown another embodiment of my invention which includes means for causing the wheels at opposite ends of a hatch beam to rotate together. This prevents one end of the beam moving faster than the other which would be apt to result in the jamming of the beam in a more or less "skewed" position across the hatch.

In Fig. 12 like numerals are attached to parts like those already described in connection with the embodiments of the invention illustrated in Figs. 1 to 12. The wheels 35 are keyed to the ends of a shaft 320 which runs longitudinally of the beam from one end thereof to the other, as shown at 336. With this construction both wheels must rotate together. The shaft 320 is mounted in suitable bearings in blocks such as that shown at 330. Z-shaped straps 40' are attached at their lower ends to the web of the beam by means of bolts 43 and 44 and to the flange of the beam by means of screws 41 and 42. Blocks 330 are adapted to slide up and down through a limited distance between the Z-shaped straps 40' and the web of beam 4. In-turned edges on the members 40' shown in dotted lines at 300, keep the blocks 330 from moving longitudinally of the beam yet permit them to move vertically. Sufficient play is allowed between blocks 330 and the edges 300 so that one end of the hatch beam may be raised without raising the other end, and yet the blocks 330 will not bind in the Z-shaped members 40'.

Collars 301 attached to and made an integral part of shaft 320 cooperate with blocks 330 to prevent relative longitudinal movement of the shaft 320 and beam 4.

With the construction shown, it is readily understood that shaft 320 is free to rotate in the block 330. The blocks in turn may move up and down in the straps 40' and the collars 301 prevent longitudinal relative movement of the shaft 320 and the beam 4.

Adjacent to wheels 35 is mounted at each end of shaft 320, a cam lifting device similar to that shown in detail in Figs. 4 to 6. This device includes a cam surface 45 and a handle retaining portion 46. This cam lifting device is mounted on suitable bearings 304 which are designed to permit relative rotation of shaft 320 and the cam lifting surface. The handle portion 46 is equipped with the handle receiving aperture 48. The cam surface is equipped with a locking pin hole 61, into which a lock pin such as 60 may be inserted to lock the cam surface and the flange of the beam together after the beam is raised in relation to the lifting mechanism.

In operation the cam surfaces are rotated as heretofore described with the result that the beam 4 will be raised in relation to the shaft 30 and the weight thereof will rest on the wheels 35. As the beam is rolled along the hatchway, it cannot be readily moved from a position parallel to the fore and aft edges of the hatchway because both wheels supporting the beam must rotate together.

In Figs. 13 and 14 is shown an embodiment of the invention wherein like reference characters will be applied to those parts which are the same or substantially the same as the parts heretofore described. In this construction like that shown in Fig. 12, the supporting wheels 35 are mounted upon and keyed to a shaft 320. Shaft 320 is rotatable in two identical bearings, one of which is illustrated and will be described. It is shown at 340 and is supported on bolt 341 passing through the web of the beam 4 and securely attached thereto by nut 342. On bolt 341 is a rotatable cam 343, integrally formed with a handle receiving portion 344 having two handle receiving apertures 345 and 346. A pair of collars, one of which is shown at 301 of Fig. 13, prevents longitudinal movement of shaft 320 in relation to beam 4.

In operation when it is desired to lift the beam 4, a suitable handle is inserted in the handle retaining member 344 and this member is rotated, thus turning cam 343 so as to move the beam 4 upwardly in relation to the shaft 320. In this construction like the construction shown in Fig. 12, both wheels 35 are keyed to shaft 320 by means of keys such as that shown at 336 and therefore must rotate together. This will prevent one end of the beam moving faster or slower than the other one.

Figure 16:
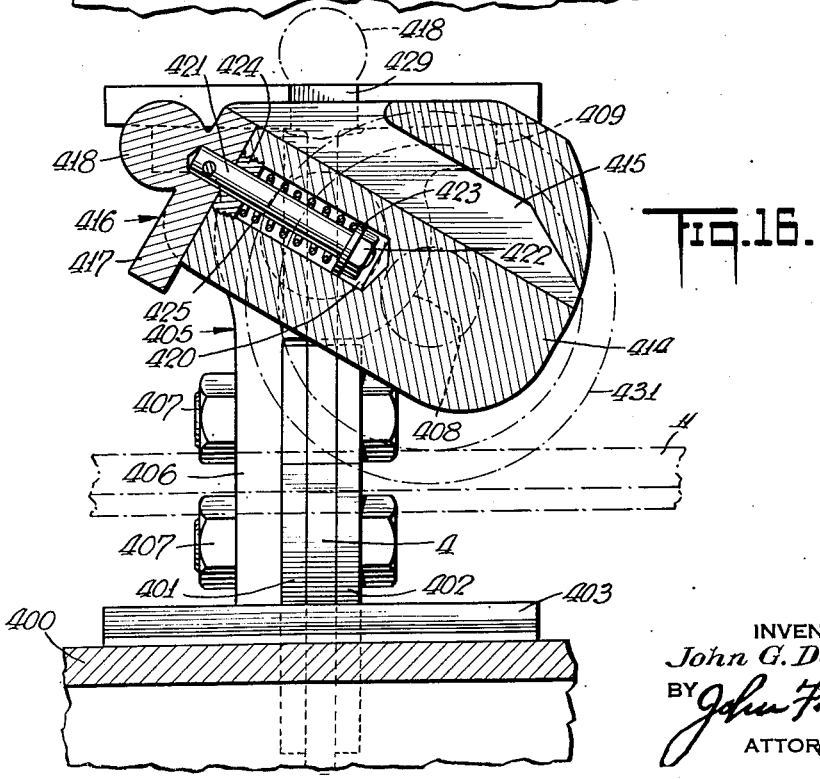
Fig. 16 is a section through 16—16 of Fig. 15.

Figs. 15 and 16 show a crank type of beam lifting device. Looking at these figures, the hatch beam is shown at 4, the hatch cover at C, the track at 11 and an angle support at 18. An off-set coaming with a horizontal beam supporting surface at 400 is illustrated.

The web of the hatch beam 4 is strengthened with stiffeners 401 and 402 which are flat plates welded, bolted, riveted or otherwise secured to the web of the beam. A horizontally disposed supporting plate 403 is slotted so as to fit the web and stiffeners and is then welded thereto. This slotted supporting plate 403 is designed to rest upon the off-set portion 400 of the coaming and to support the hatch beam when the beam is in use.

A crank pin bearing support 405 comprises a lower portion 406 made up more or less in the form of a flate plate and designed to be bolted to the web 4 of the hatch beam and to the web stiffeners 401 and 402 with bolts 407. The upper portion of this crank pin bearing support is formed into a cylinder for receiving the crank pin, as shown at 408. Above this the top of the crank pin bearing support flares out into a horizontal supporting surface 409 designed to engage the underside of the upper flange of beam 4 and serve to support the projecting portion thereof as disclosed in the figures. This is advantageous because it is necessary to remove the web portion of the beam underneath this part of the flange to make room for the crank pin supporting member as is illustrated in Fig. 15.

The crank pin 410 is designed to cooperate with the support 405 and to fit into and rotate in the portion 408 of the member 405. As shown in Fig. 15, the left end of said crank pin projects out beyond the member 405 to permit a certain amount of longitudinal play in the bearing support. The crank pin is secured in place by a suitable bolt 411 which is designed to be screwed into the end thereof and pinned in place by pin 412. With this construction, it can be seen that crank pin 410 is centered on the web of the beam 4, is readily rotatable in its support and possesses a limited amount of longitudinal movement to compensate for irregularities in the coaming and the hatch beam track.

The crank attached to the right end of the crank pin 410 (Fig. 15) includes an operating handle aperture 415 into which a pinch bar or any suitable operating handle may be inserted to rotate the crank 414. The locking pin 416 comprises an elongated portion 417, handle or knob 418 and means for retaining the pin in position on the crank. This means includes an aperture 420 drilled into said crank parallel to the handle receiving aperture 415, and a retaining pin 421 attached to pin 416 and projecting into aperture 420. The lower or right hand end (Fig. 16) of pin 421 is equipped with nut 422 and a washer 423 and between this washer 423 and a suitable bushing 424 is a coil spring 425, which serves to urge the pin 416 downwardly into a suitable recess 427 cut in the top of crank 414. Groove or notch 428 at right angles to recess 427 is designed to accommodate pin 416 when it is disposed in a position at right angles to that shown in the figures. When the crank 414 is rotated in a clockwise direction (Fig. 16) about 45°, groove or notch 428 will register with a notch 429 cut in the upper flange of beam 4 and when the locking pin 416 is raised out of the groove 427 and rotated in a clockwise direction (Fig. 15) 90°, it may be dropped into notches 428 and 429 thus locking the crank 414 and the beam 4 together. This can be done only when the beam 4 is in its raised position.

Another crank pin 430 is attached to crank 414 on the opposite side from pin 410, and, of course, with an axis off-set to the axis of pin 410. On this pin is mounted a grooved wheel 431 equipped with suitable roller bearings 432 all of which are retained in position on the pin 430 by means of bolt 433, so that the wheel 431 may rotate freely on the crank pin 430. As is shown in Fig. 15, wheel 431 is designed to cooperate with track 11 so as to roll therealong.

The figures show the beam in its lowermost position, that is, resting on the off-set portion of the coaming and designed to receive the sides of the hatch covers. When it is desired to raise the beam so that it may be rolled toward one end of the hatch, it is only necessary to insert an operating handle in the aperture 415 and rotate the crank 414 in a clockwise direction (Fig. 15) about 45° until the axes of pins 410 and 430 lay in a vertical plane with the latter below the former. Then the locking pin 416 may be raised from the groove 427, rotated at 90° until it can be placed in notches 428 and 429. This will serve to lock the beam in its raised position. The operating handle may be removed and when this operation is performed, the beam is ready to be rolled along the track 11 to any desired position thereon.

When it is desired to return the beam to a position on the coaming, it is only necessary to remove the locking pin 416 and rotate the crank in a counter-clockwise direction so as to return the mechanism shown in the figures.

As in the other embodiments of my invention, each end of each hatch beam must be equipped with a lifting means.

I wish it to be understood that I do not limit myself to the exact details of construction shown and described, as my invention is obviously capable of various modifications.

I claim:

1. In combination, a hatch beam, a hatch framing, a track mounted on said framing, a pair of lifting and rolling units each comprising a movable arm pivoted to said beam at a point spaced from the end thereof, a wheel mounted on the free end of said pivoted arm, a cam mounted on said arm, and means for rotating said cam to raise and lower said beam in relation to said arm.

2. In combination, a hatch beam, a hatch framing, a track mounted on said framing, a pair of lifting and rolling units each comprising a movable arm pivoted to said hatch beam at a point spaced from the end thereof, a wheel mounted for rotation on said arm and adapted to roll on said track, a cam mounted on said arm, a handle receiving member attached to said cam and means for locking said cam in such position that said beam is raised to its uppermost position.

JOHN G. DEEGAN.